United States Patent
Oomens et al.

(10) Patent No.: US 8,146,366 B2
(45) Date of Patent: Apr. 3, 2012

(54) METHOD FOR OPERATING A COMBINED-CYCLE POWER PLANT, AND COMBINED-CYCLE POWER PLANT USEFUL FOR CARRYING OUT THE METHOD

(75) Inventors: Gijsbertus Oomens, Nussbaumen (CH); Christoph Ruchti, Uster (CH); François Droux, Oberrohrdorf (CH)

(73) Assignee: ALSTOM Technology Ltd., Baden (CH)

( * ) Notice: Subject to any disclaimer, the term of this patent is extended or adjusted under 35 U.S.C. 154(b) by 791 days.

(21) Appl. No.: 12/198,359

(22) Filed: Aug. 26, 2008

(65) Prior Publication Data
US 2009/0064656 A1 Mar. 12, 2009

(30) Foreign Application Priority Data
Sep. 7, 2007 (CH) .................................. 1406/07

(51) Int. Cl.
F02C 1/00 (2006.01)
(52) U.S. Cl. ............ 60/772; 60/39.182; 60/806; 60/782
(58) Field of Classification Search ............. 60/772, 60/39.182, 806, 782, 785
See application file for complete search history.

(56) References Cited

U.S. PATENT DOCUMENTS

| | | | |
|---|---|---|---|
| 5,689,948 A * | 11/1997 | Frutschi | 60/774 |
| 6,018,942 A * | 2/2000 | Liebig | 60/39.182 |
| 6,519,927 B2 * | 2/2003 | Liebig et al. | 60/39.182 |
| 6,560,966 B1 * | 5/2003 | Fetescu et al. | 60/775 |
| 6,786,034 B2 * | 9/2004 | Liebig et al. | 60/39.41 |
| 7,032,373 B2 * | 4/2006 | Franke et al. | 60/39.182 |
| 2006/0123767 A1 * | 6/2006 | Briesch | 60/39.182 |

FOREIGN PATENT DOCUMENTS

| | | |
|---|---|---|
| DE | 19832294 | 12/1999 |
| DE | 10032625 | 8/2001 |
| EP | 1219801 | 12/2001 |
| EP | 1262638 | 12/2002 |
| EP | 1808588 | 7/2007 |
| WO | WO99/57421 | 11/1999 |

OTHER PUBLICATIONS

Search Report for Swiss Patent App. No. 1406/2007 (May 1, 2008).

* cited by examiner

*Primary Examiner* — William H Rodriguez
*Assistant Examiner* — Nicholas Karnezos
(74) *Attorney, Agent, or Firm* — Cermak Nakajima LLP; Adam J. Cermak

(57) ABSTRACT

A method involved operating a combined-cycle power plant (10), which has a gas turbine (11) with a compressor (12) and a turbine (13), a heat recovery steam generator (17) which is connected downstream to the gas turbine (11) and is for producing steam in a water/steam cycle, and also at least one once-through cooler (21), through which flows compressed air which is compressed in the compressor (12) and intended for cooling the gas turbine (11), and, cooling down, converts feed-water (24) which is fed from the heat recovery steam generator (17) into steam, and discharges the steam to the heat recovery steam generator (17). Making the operation more flexible is achieved, without lowering the load of the gas turbine (11), by the combined-cycle power plant (10) being switched between a first operating mode, in which only the gas turbine cycle is used for power generation, and a second operating mode, in which the gas turbine cycle and the water/steam cycle are used for power generation.

8 Claims, 4 Drawing Sheets

METHOD FOR OPERATING A COMBINED-CYCLE POWER PLANT, AND COMBINED-CYCLE POWER PLANT USEFUL FOR CARRYING OUT THE METHOD

This application claims priority under 35 U.S.C. §119 to Swiss application no. 01406/07, filed 7 Sep. 2007, the entirety of which is incorporated by reference herein.

BACKGROUND

1. Field of Endeavor

The present invention relates to the field of power plant technology. It refers to a method for operating a combined-cycle power plant and to a combined-cycle power plant useful for carrying out the method.

2. Brief Description of the Related Art

In order to increase the efficiency of combined-cycle power plants, the gas turbines in the prior art were run with high compression ratios. In the case of known gas turbines, such as ALSTOM's type GT26, compressed air is tapped from the compressor of the gas turbine in order to cool the combustor and parts of the turbine. The high temperatures of the tapped air which result during compression require cooling before the pressurized air (compressed air) can be used as cooling air. The compressed air can be cooled down, for example, in one or more once-through cooler(s) (OTC). In a combined-cycle power plant, water is tapped from the heat recovery steam generator for this purpose and delivered to the once-through cooler in order to cool the compressed air there. During this process, steam is produced in the once-through cooler. The superheated steam from the once-through cooler is fed back to the heat recovery steam generator.

It would now be desirable, for increasing the availability and flexibility of the operation, to configure and to operate a combined-cycle power plant so that it can be operated both in an operating mode which operates with two cycles (combined cycle, CC) and in an operating mode which operates with only one cycle (single cycle, SC).

If a combined-cycle power plant is operated with only one cycle, that is to say the gas turbine cycle, in which the heat recovery steam generator is not available, and if the power plant is changed over from the one operating mode to the other, the following problems result:

How is the once-through cooler, especially its pressure and temperature, to be controlled if it is switched?

In the case of the operating mode with only one cycle, where is the water for the once-through cooler to be found?

What is to happen to the steam which is produced in the once-through cooler?

Although the operating mode with two cycles, from the point of view of efficiency, is of more interest to the operator than the operating mode with only one cycle, the latter can gain importance if the operator would like to have more flexibility during operation of the plant and improved availability without the entire plant having to be shut down. The operating mode with only one cycle can also be useful if a power plant is first constructed with only one cycle which later is expanded into a combined-cycle power plant.

Furthermore, a changeover from the operating mode with only one cycle to the operating mode with two cycles, as a fast start concept, is of importance for the power plant.

SUMMARY

One of numerous aspects of the present invention involves an operating method for a combined-cycle power plant and also a combined-cycle power plant useful for carrying out the method, which can increase the flexibility during operation of the plant and which can have improved plant availability as a result.

Another aspect of the present invention includes that, for making the operation more flexible, without lowering the load of the gas turbine, the combined-cycle power plant is switched between a first operating mode (single-cycle operation), during which only the gas turbine cycle is used for power generation, and a second operating mode (combined-cycle operation), in which the gas turbine cycle and the water/steam cycle are used for power generation.

Another aspect of exemplary methods according to the invention includes that, when switching from the second operating mode to the first operating mode, the hot exhaust gases from the gas turbine are successively diverted away from the heat recovery steam generator into a secondary exhaust stack, and vice versa, and that a deflection flap, which is arranged in the exhaust gas duct which leads from the gas turbine to the heat recovery steam generator, is operated for the diverting of the hot exhaust gases.

At the same time, the discharge of steam from the once-through cooler to the heat recovery steam generator is preferably reduced and the steam is used otherwise, or vice versa, wherein the steam which is drawn from the heat recovery steam generator is either discharged into the secondary exhaust stack or admixed with the compressed air which is guided through the once-through cooler, or is fed to an air-cooled condenser, in order to minimize the loss of demineralized water.

At the same time the feed of feed water from the heat recovery steam generator is preferably also reduced and substituted by another feed of feed water, or vice versa, wherein, in the transition phase, cold water is admixed with the feed water by a separate cold water mixing line.

In particular, the supply of feed water from the heat recovery steam generator is reduced by a control valve which is arranged in a feed-water bypass line, after the supply of the once-through cooler with the feed water has been switched to the feed-water bypass line, or vice versa.

For the other feed of feed water, a separate single-cycle feed-water system is preferably used.

Yet another aspect of a combined-cycle power plant embodying principles of the present invention includes that a deflection flap is arranged in the exhaust gas duct for diverting the hot exhaust gases from the heat recovery steam generator to the secondary exhaust stack.

In particular, a first shut-off valve is arranged in the first steam discharge line, and a second steam discharge line, which is provided for the first operating mode, branches off from the first steam discharge line upstream of the first shut-off valve.

According to an exemplary embodiment, a second shut-off valve and a first control valve are arranged in series in the second steam discharge line.

Another aspect of the present invention includes that a third shut-off valve is arranged in the first feed-water supply line, and that a feed-water bypass line, in which a fourth shut-off valve and a second control valve are arranged in series, is provided for bypassing the third shut-off valve, wherein a cold water mixing line leads into the first feed-water line between the feed-water bypass line and the once-through cooler, and a fifth shut-off valve and a third control valve are arranged in series in the cold water mixing line.

Furthermore, it is advantageous if a second feed-water line, which comes from a separate single-cycle feed-water system, leads into the first feed-water line between the feed-water bypass line and the once-through cooler, and if a sixth shut-off valve is arranged in the second feed-water line.

BRIEF DESCRIPTION OF THE DRAWINGS

The invention is to be subsequently explained in more detail based on exemplary embodiments in conjunction with the drawing. In the drawing.

DETAILED DESCRIPTION OF EXEMPLARY EMBODIMENTS

In general terms, methods and systems are described for a combined-cycle power plant which enables a switching between two operating modes, specifically between the conventional combined-cycle operation with gas turbine and steam turbine, and the single-cycle operation only with the gas turbine, without interrupting power generation.

Figure 1:
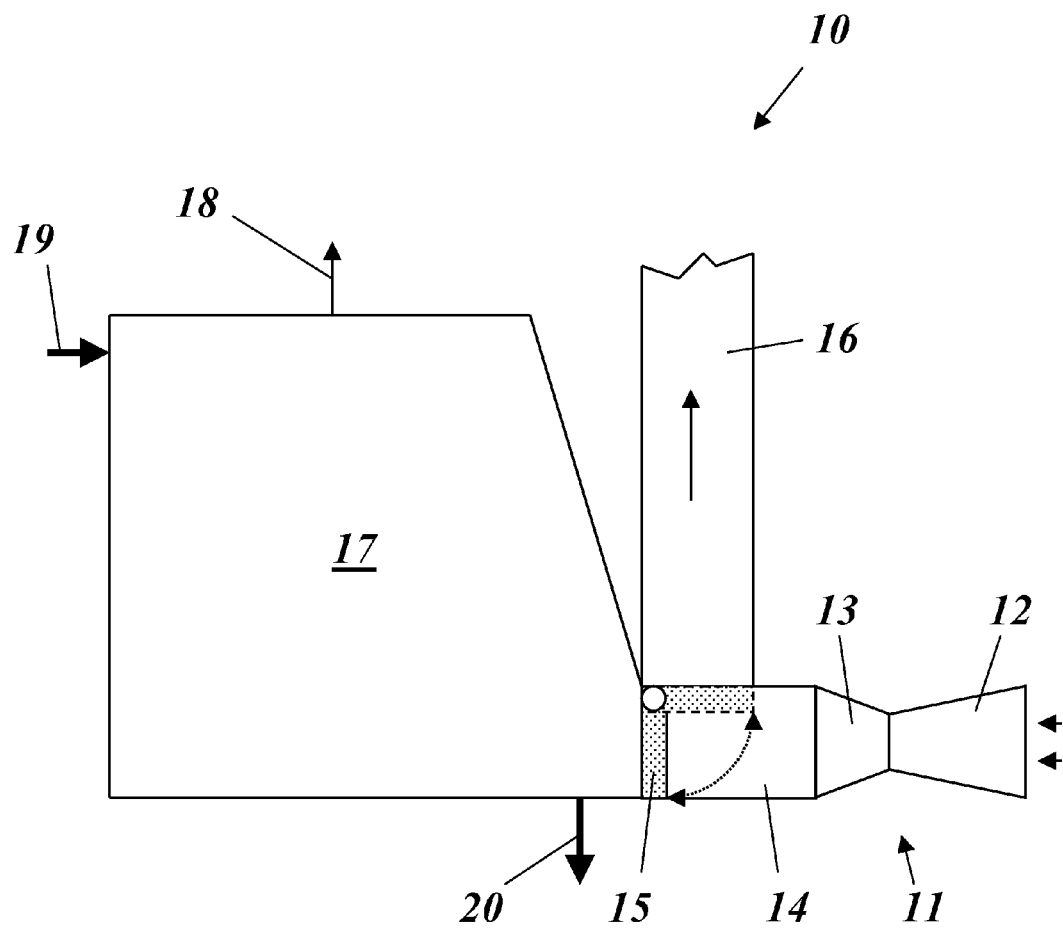
FIG. 1 shows a partial aspect of a combined-cycle power plant useful for carrying out methods according to the invention, with a heat recovery steam generator, which is connected downstream to a gas turbine, and a secondary exhaust stack for deflecting the hot exhaust gases.

For this purpose, a configuration of the combined-cycle power plant, as is reproduced in FIG. 1, is assumed. In the case of the combined-cycle power plant 10 of FIG. 1, a gas turbine 11 is provided, which with a compressor 12 draws in and compresses air, uses the compressed air for combusting a fuel in a combustor (not shown), and in a turbine 13 expands the hot gases which result in the process, performing work. The turbine 13 customarily drives the compressor 12 and an electric generator (not shown).

The hot exhaust gases which issue from the turbine 13 are fed during combined-cycle operation via an exhaust gas duct 14 to a heat recovery steam generator 17 where, by heat exchange, they convert feed water, which is fed via a feed-water inlet 19, into steam which is discharged at a superheated steam outlet 20. The cooled exhaust gases leave the heat recovery steam generator 17 via an exhaust gas outlet 18. The heat recovery steam generator 17 is part of a water/steam cycle (not shown) with steam turbine, condenser, feed-water tank, and feed-water pump. A secondary exhaust stack 16 branches off from the exhaust gas duct 14 upstream of the heat recovery steam generator 17. A deflection flap 15, which can be switched between two end positions, is arranged in the exhaust gas duct 14 at the branch point. In the one end position (drawn-in with a dashed line in FIG. 1), the deflection flap 15 allows the exhaust gases to pass from the gas turbine to the heat recovery steam generator 17 unhindered, and at the same time shuts off the secondary exhaust stack 16. This end position is used during the customary combined-cycle operation. In the other end position (drawn-in with a continuous line in FIG. 1), the connection to the heat recovery steam generator 17 is broken and the hot exhaust gases are deflected directly into the secondary exhaust stack 16. In this second end position, the deflection flap 15 is repositioned if there is switching from combined-cycle operation to single-cycle operation, in which only the gas turbine 11 is in operation without the water/steam cycle and generates power.

Figure 2:
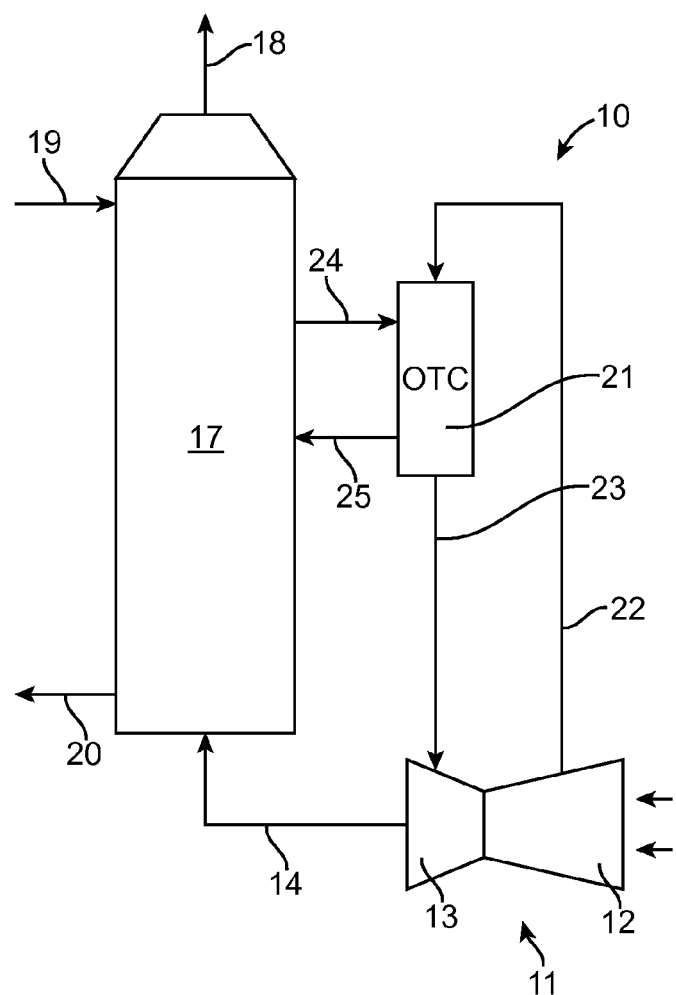
FIG. 2 shows a further partial aspect of the combined-cycle power plant, with a once-through cooler for cooling the compressed cooling air and which during combined-cycle operation is connected to the heat recovery steam generator.

In the case of the present combined-cycle power plant, the turbine 13, and if applicable also the combustor, is furthermore cooled with air which is bled from the compressor 12 at one or more points and, according to FIG. 2, is fed via a compressed air line 22 to at least one subsequent once-through cooler 21 and there cooled down. The once-through cooler 21 in this case is connected via a feed-water supply line 24 and a steam discharge line 25 to the heat recovery steam generator 17. During combined-cycle operation, the heat recovery steam generator 17 is supplied with cold feed water via the feed-water inlet 19, and supplied with hot exhaust gases from the gas turbine 11 via the exhaust gas duct 14. Through a plurality of stages the feed water is heated and evaporated, and leaves the heat recovery steam generator 17 via the superheated steam outlet 20 as superheated steam. As a result of this heat exchange process, the exhaust gases are cooled down and leave the heat recovery steam generator 17 via the exhaust gas outlet 18.

At the midway point, after the preheating stages, feed water is extracted from the heat recovery steam generator 17 and fed via the feed-water supply line 24 to the once-through cooler 21 where it cools down the compressed air from the gas turbine 11. The steam which is produced in the once-through cooler 21 flows back via the steam discharge line 25 to the heat recovery steam generator 17, while the cooled-down air is directed back via the compressed air line 23 to the gas turbine 11 for cooling purposes.

Figure 3A:
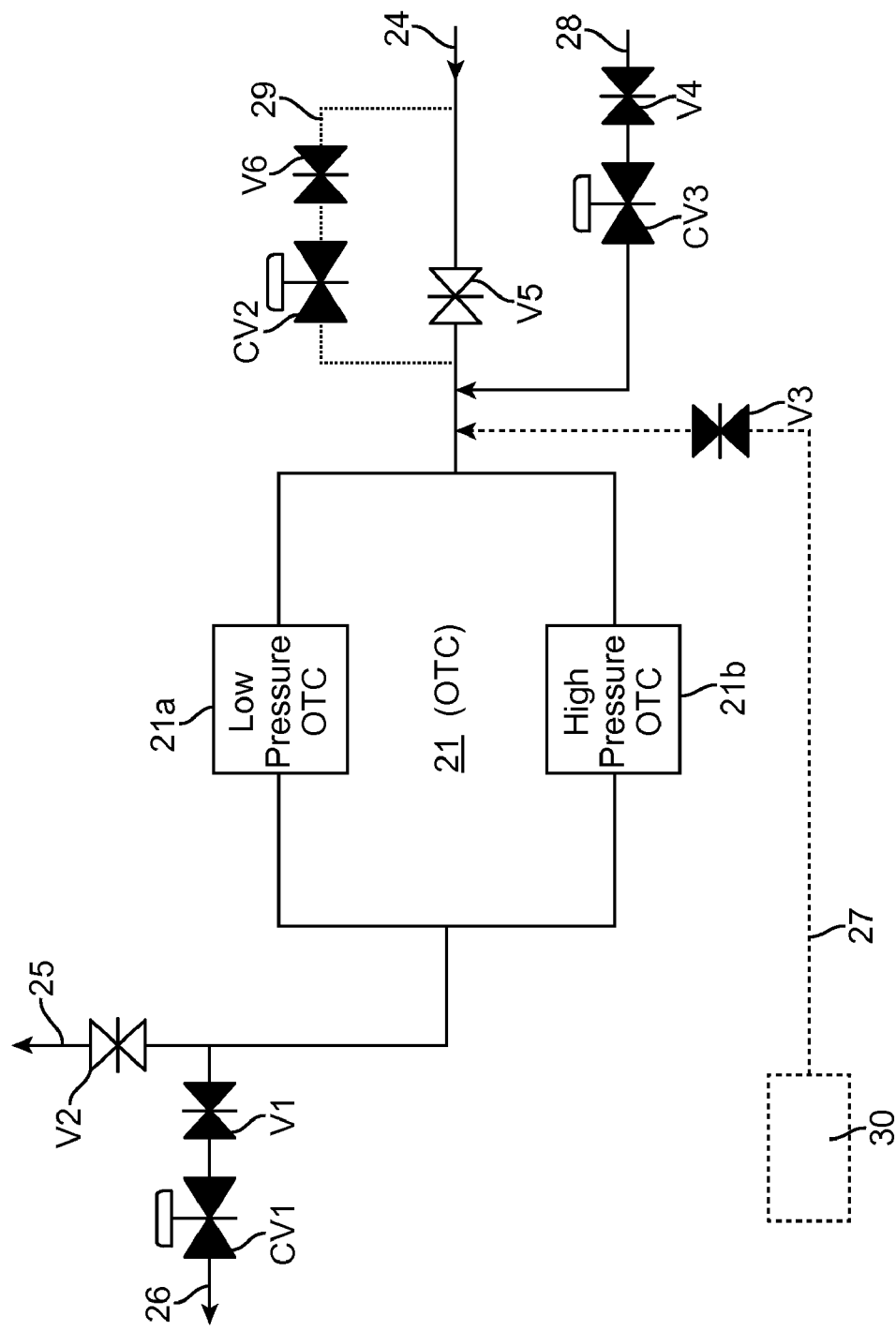
FIG. 3A shows in detail a connecting configuration of the once-through cooler from FIG. 2 in the combined-cycle operating mode, which enables a switching between combined-cycle operation and exclusive gas turbine operation according to the invention.
Figure 3B:
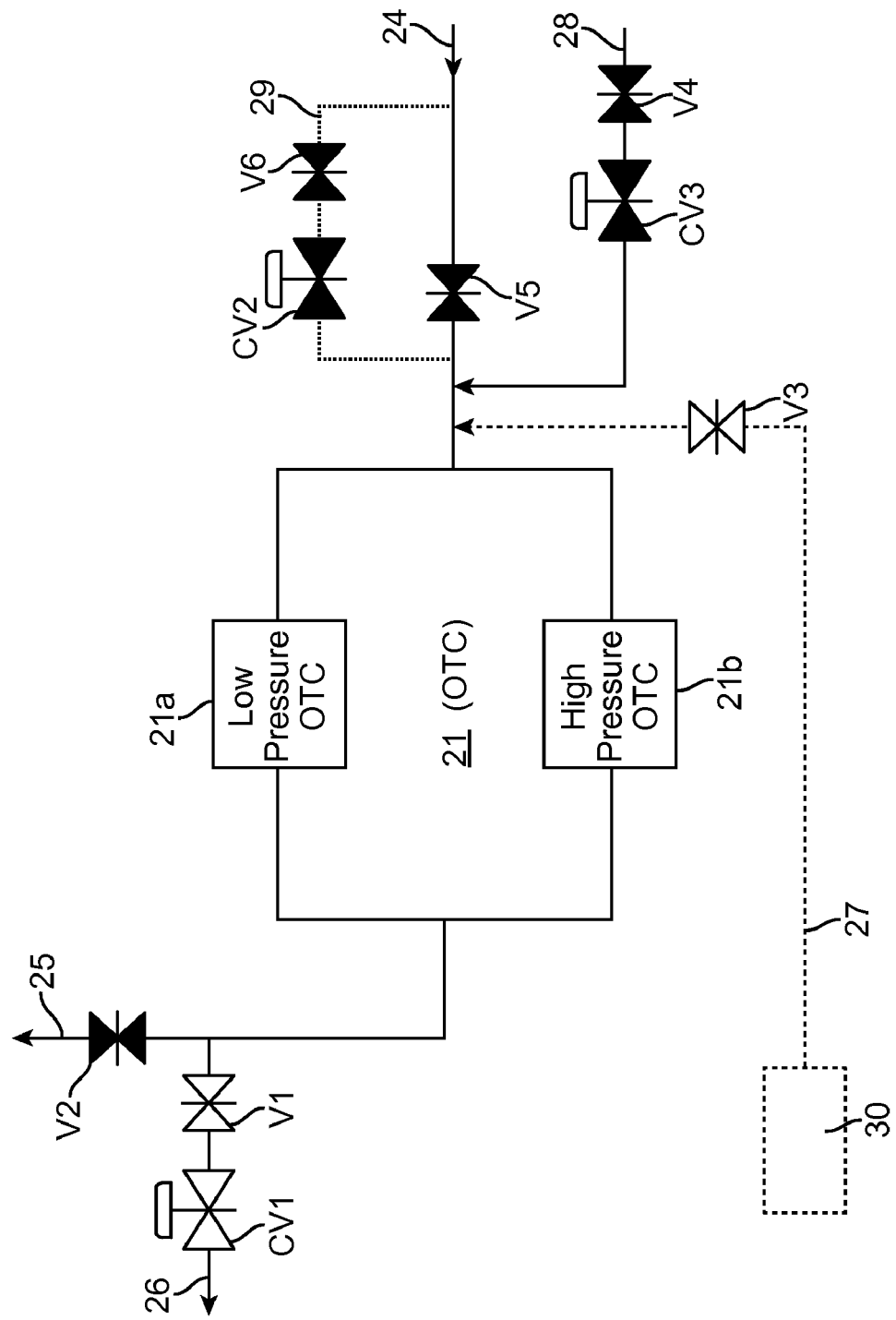
FIG. 3B shows in detail a connecting configuration of the once-through cooler from FIG. 2 in the single-cycle operating mode, which enables a switching between combined-cycle operation and exclusive gas turbine operation according to the invention.

In order to enable switching between combined-cycle operation and single-cycle operation in the configuration with the once-through cooler 21 and the heat recovery steam generator 17, without lowering the load of the gas turbine, an arrangement according to the exemplary embodiment of FIG. 3A and FIG. 3B is provided. The feed-water line 24, in which a shut-off valve V5 is installed, leads from the heat recovery steam generator 17 to the once-through cooler 21 which is divided into a low-pressure once-through cooler 21a and a high-pressure once-through cooler 21b. A cold-water mixing line 28, which comes from the heat recovery steam generator 17 and in which a shut-off valve V4 and a control valve CV3 for controlling the feed-water temperature during switching are installed in series, enters downstream of the shut-off valve V5. The shut-off valve V5 in the feed-water supply line 24 can be bypassed by a feed-water bypass line 29 in which a shut-off valve V6 and a control valve CV2, for ensuring a smooth change of the feed-water pressure when switching from single-cycle operation to combined-cycle operation, are installed in series. A shut-off valve V2 is inserted into the steam discharge line 25 which leads to the heat recovery steam generator 17. A steam discharge line 26, which discharges the steam during single-cycle operation, branches off upstream of the shut-off valve V2, and in which a shut-off valve V1 and a control valve CV1 are installed in series.

During combined-cycle operation (gas turbine and steam turbine), the feed water from the heat recovery steam generator 17 flows in the feed-water supply line 24 through the open shut-off valve V5 at high pressure into the once-through cooler 21. The superheated steam is returned via the steam discharge line 25 and the open shut-off valve V2 to the superheated section of the heat recovery steam generator 17. The shut-off valve V1 in this case is closed.

During single-cycle operation (only with the gas turbine), feed water is fed from a separate single-cycle feed-water system 30 via the feed-water supply line 27 at medium pressure and through the shut-off valve V3 which isolates the single-cycle feed-water system 30 from the feed-water system of the heat recovery steam generator 17. On account of corrosion, it is essential in this case that the feed water during single-cycle operation is made available at a temperature of 150° C., which is lower in comparison to combined-cycle operation. The steam which is produced in the once-through cooler 21 flows out via the steam discharge line 26, wherein the valves V1 and CV1 are used for switching and controlling purposes.

The process parameters during combined-cycle operation and during single-cycle operation differ both with regard to pressure and with regard to temperature. For a smooth temperature transition when switching from combined-cycle operation to single-cycle operation, the cold water mixing line 28 is provided with valves CV3 and V4. For a stepless change of the feed-water pressure, a feed-water bypass line 29 with valves CV2 and V6 is included.

The steam which is discharged from the once-through cooler 21, via the steam discharge line 26 during single-cycle operation, can be used in another way:

The steam is released either into the secondary exhaust stack 16;

or it is injected into the compressed air line 22 which leads to the once-through cooler 21;

or it is fed to an air-cooled condenser (not shown in the figures) in order to minimize the losses of demineralized water.

For switching from combined-cycle operation to single-cycle operation with continuous power generation, the secondary exhaust stack 16 with the deflection flap 15 is initially necessary. Furthermore, it is to be taken into account that the process parameters in the case of single-cycle operation and combined-cycle operation differ from each other. In particular, the feed-water pressures and steam pressures, and also feed-water temperatures and possibly the steam temperatures, are highest at the once-through cooler during combined-cycle operation. Therefore, when switching from combined-cycle operation to single-cycle operation the following steps are advantageously complied with:

In order to avoid temperature changes in the case of the feed water, first of all the deflection flap is gradually closed in parallel with the following steps (pivoted into the end position which is drawn-in with a continuous line in FIG. 1).

The shut-off valve V2 in the steam discharge line 25 to the heat recovery steam generator 17 begins to be closed so that the pressure upstream of the control valve CV1 in the other steam discharge line 26 is initially equal to the pressure in combined-cycle operation. If the shut-off valve V2 is completely closed, the pressure should be brought into line with the nominal pressure in the case of single-cycle operation.

The valves V4 and CV3 of the cold water mixing line 28 are opened and gradually the feed-water temperature is lowered with a moderate rate of change from the level of combined-cycle operation to the level of single-cycle operation in order to keep the temperature of the gas turbine cooling air stable.

With the shut-off valve V5 held open, the valves CV2 and V6 of the feed-water bypass line 29 are gradually opened.

The shut-off V5 is then closed.

The two control valves CV2 and CV3 are then gradually closed at the same time, and the feed-water temperature held at the level of single-cycle operation in the process. The control valve CV2 is closed with a controlled gradient. At the same time, the shut-off valve V3 in the feed-water supply line 27 is opened.

When switching from single-cycle operation to combined-cycle operation, exactly the reverse is carried out. The described procedure is particularly advantageous in order to ensure that overswinging of the pressure and subcooling in the once-through cooler are minimal.

Altogether, systems and methods embodying principles of the present invention can include the following characteristics and advantages:

1. A combined-cycle power plant with one or more once-through cooler(s) for the gas turbine cooling air, and secondary exhaust stack with deflection flap, can be switched between combined-cycle operation and single-cycle operation without lowering the load of the gas turbine and without allowing the cooling air temperatures of the gas turbine to become unstable.

2. The combined-cycle power plant for this purpose has the following sub-systems:

A single-cycle feed-water system for single-cycle operation.

A steam system for diverting the steam which is produced during single-cycle operation.

A switching system which enables a smooth transition in pressure and temperature between single-cycle operation and combined-cycle operation.

3. The switching system features the following items:

A first feed-water supply line 24 from the heat recovery steam generator 17, with a shut-off valve V5;

A cold water mixing line 28 from the heat recovery steam generator 17, with a shut-off valve V4 and a control valve CV3 for controlling the feed-water temperature during switching;

A feed-water bypass line, with a shut-off valve V6 and a control valve CV2, in order to ensure a smooth transition in the feed-water pressure when switching from single-cycle operation to combined-cycle operation; and A shut-off valve V2 in the steam discharge line 25 to the heat recovery steam generator, and a steam discharge line 26, which branches off upstream of the shut-off valve, to a steam system for single-cycle operation and in which a shut-off valve V1 and a control valve CV1 are arranged.

| List of designations | |
|---|---|
| 10 | Combined-cycle power plant |
| 11 | Gas turbine |
| 12 | Compressor |
| 13 | Turbine |
| 14 | Exhaust gas duct |
| 15 | Deflection flap |
| 16 | Secondary exhaust stack |
| 17 | Heat recovery steam generator (HRSG) |
| 18 | Exhaust gas outlet |
| 19 | Feed-water inlet |
| 20 | Superheated steam outlet |
| 21 | Once-through cooler (OTC) |
| 21a | Low-pressure once-through cooler |
| 21b | High-pressure once-through cooler |
| 22, 23 | Compressed air line |
| 24 | Feed-water supply line (OTC) |
| 25 | Steam discharge line (OTC) |
| 26 | Steam discharge line (SC) |
| 27 | Feed-water supply line (SC) |
| 28 | Cold water mixing line |
| 29 | Feed-water bypass line |
| 30 | Single-cycle feed-water system |
| V1, . . . , V6 | Valve |
| CV1, . . . , CV3 | Control valve |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for operating a combined-cycle power plant, the plant including a gas turbine with a compressor and a turbine, a heat recovery steam generator connected downstream to the gas turbine and configured and arranged to produce steam in a water/steam cycle, and at least one once-through cooler through which flows compressed air when compressed in the compressor and for cooling the gas turbine, and, converts feed water supplied from the heat recovery steam generator into steam, and discharges the steam to the heat recovery steam generator, the method comprising:
    switching the combined-cycle power plant between a single-cycle operating mode, in which only a gas turbine cycle is used for power generation, and a combined-cycle operating mode, in which the gas turbine cycle and the water/steam cycle are used for power generation, without lowering the load of the gas turbine;
    wherein switching to the single-cycle operating mode comprises diverting hot exhaust gases from the gas turbine away from the heat recovery steam generator into a secondary exhaust stack, and simultaneously reducing the discharge of steam from the once-through cooler to the heat recovery steam generator and discharging excess steam from the once-through cooler; and
    wherein switching to the combined-cycle operating mode comprises directing hot exhaust gases from the gas turbine to the heat recovery steam generator, and simultaneously increasing the discharge of steam from the once-through cooler to the heat recovery steam generator and reducing the discharge of excess steam from the once-through cooler.

2. The method as claimed in claim 1, wherein the plant includes a deflection flap arranged in an exhaust gas duct which leads from the gas turbine to the heat recovery steam generator, and wherein diverting away hot exhaust gases further comprises operating the deflection flap.

3. The method as claimed in claim 1, wherein discharging excess steam comprises discharging into the secondary exhaust stack.

4. The method as claimed in claim 1, wherein discharging excess steam comprises admixing said excess steam with the compressed air which is guided through the once-through cooler.

5. The method as claimed in claim 1, wherein discharging excess steam comprises feeding said excess steam to an air-cooled condenser to minimize the loss of demineralized water.

6. A method for operating a combined-cycle power plant, the plant including a gas turbine with a compressor and a turbine, a heat recovery steam generator connected downstream to the gas turbine and configured and arranged to produce steam in a water/steam cycle, and at least one once-through cooler through which flows compressed air when compressed in the compressor and for cooling the gas turbine, and, converts feed water supplied from the heat recovery steam generator into steam, and discharges the steam to the heat recovery steam generator, the method comprising:
    switching the combined-cycle power plant between a single-cycle operating mode, in which only a gas turbine cycle is used for power generation, and a combined-cycle operating mode, in which the gas turbine cycle and the water/steam cycle are used for power generation, without lowering the load of the gas turbine;
    wherein switching to the single-cycle operating mode comprises diverting hot exhaust gases from the gas turbine away from the heat recovery steam generator into a secondary exhaust stack, and simultaneously reducing a feed of feed-water from the heat recovery steam generator and substituting feed-water from another source of feed water; and
    wherein switching to the combined-cycle operating mode comprises directing hot exhaust gases from the gas turbine to the heat recovery steam generator, and simultaneously reducing the feed of feed-water from said another source of feed water and substituting feed-water from the heat recovery steam generator; and
    wherein said another source of feed-water comprises a separate single-cycle feed-water system.

7. The method as claimed in claim 6, wherein simultaneously reducing a feed of feed-water comprises admixing cold water with the feed water with a separate cold water mixing line.

8. The method as claimed in claim 6, wherein simultaneously reducing the feed of feed water comprises reducing the feed of feed-water from the heat recovery steam generator by a control valve arranged in a feed-water bypass line, after the supplying of the once-through cooler with feed water has been switched to the feed-water bypass line; or
    wherein simultaneously reducing the feed of feed-water comprises switching the supplying of the once-through cooler with feed water to the feed-water bypass line, after reducing the feed of feed-water from the heat recovery steam generator by a control valve arranged in a feed-water bypass line.

* * * * *